(12) United States Patent
Hoshino

(10) Patent No.: US 7,753,639 B2
(45) Date of Patent: Jul. 13, 2010

(54) OVERHEAD TRAVELLING CARRIAGE SYSTEM

(75) Inventor: Kenji Hoshino, Nagoya (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 284 days.

(21) Appl. No.: 11/199,389

(22) Filed: Aug. 9, 2005

(65) Prior Publication Data

US 2006/0072987 A1    Apr. 6, 2006

(30) Foreign Application Priority Data

Aug. 12, 2004  (JP) .............................. 2004-235193

(51) Int. Cl.
*B65G 1/00* (2006.01)

(52) U.S. Cl. .................. 414/282; 414/270; 414/271; 414/273; 414/281; 414/626; 414/807; 414/940

(58) Field of Classification Search ................. 414/940, 414/626, 270, 271, 273, 281, 282, 807; 369/30.38, 369/30.39, 30.43
See application file for complete search history.

(56) References Cited

U.S. PATENT DOCUMENTS

| 3,782,565 A * | 1/1974 | Doran et al. ................. 414/274 |
| 3,833,140 A * | 9/1974 | Young et al. ................. 414/626 |
| 4,787,804 A * | 11/1988 | Edenas ........................ 414/281 |
| 4,824,311 A * | 4/1989 | Mims .......................... 414/273 |
| 5,261,935 A * | 11/1993 | Ishii et al. ..................... 96/400 |
| 6,169,935 B1 * | 1/2001 | Iwasaki et al. ............... 700/214 |
| 6,450,318 B1 * | 9/2002 | Minardi ..................... 198/346.3 |
| 6,468,021 B1 * | 10/2002 | Bonora et al. ................ 414/522 |
| 6,851,913 B2 * | 2/2005 | Iizuka ......................... 414/626 |
| 7,165,927 B2 * | 1/2007 | Doherty et al. ......... 414/331.02 |
| 2003/0159834 A1 * | 8/2003 | Kirk et al. .................... 166/378 |
| 2004/0047714 A1 * | 3/2004 | Poli et al. .................... 414/281 |
| 2004/0091317 A1 * | 5/2004 | Shouldice ..................... 404/72 |
| 2004/0109746 A1 | 6/2004 | Suzuki |

FOREIGN PATENT DOCUMENTS

| FR | 2024298 | 8/1970 |
| JP | 11-180505 | 7/1999 |
| JP | 2000-050976 | 2/2000 |
| JP | 2000-255710 | 9/2000 |
| JP | 2002-060007 | 2/2002 |
| JP | 2004-189018 | 7/2004 |
| WO | WO 2004039700 | 5/2004 |

OTHER PUBLICATIONS

Notification of Reason(s) for Refusal in connection with Japanese Patent Application No. 2004-235193 from the Japanese Patent Office.
Notification of Reason(s) for Refusal of the Japanese Patent Application No. 2004-235193 from the Japanese Patent Office, with English translation.

\* cited by examiner

*Primary Examiner*—Michael S Lowe
(74) *Attorney, Agent, or Firm*—Westerman, Hattori, Daniels & Adrian, LLP

(57) ABSTRACT

An automatic warehouse 8 is provided parallel to a running rail 4 for an overhead travelling carriage 6. Open shelves 16 each of which is open on its side are provided in a rack 10. According to the present invention, articles can be transferred directly to and from a shelf in the automatic warehouse.

4 Claims, 5 Drawing Sheets

FIG. 4(a)
FIG. 4(b)
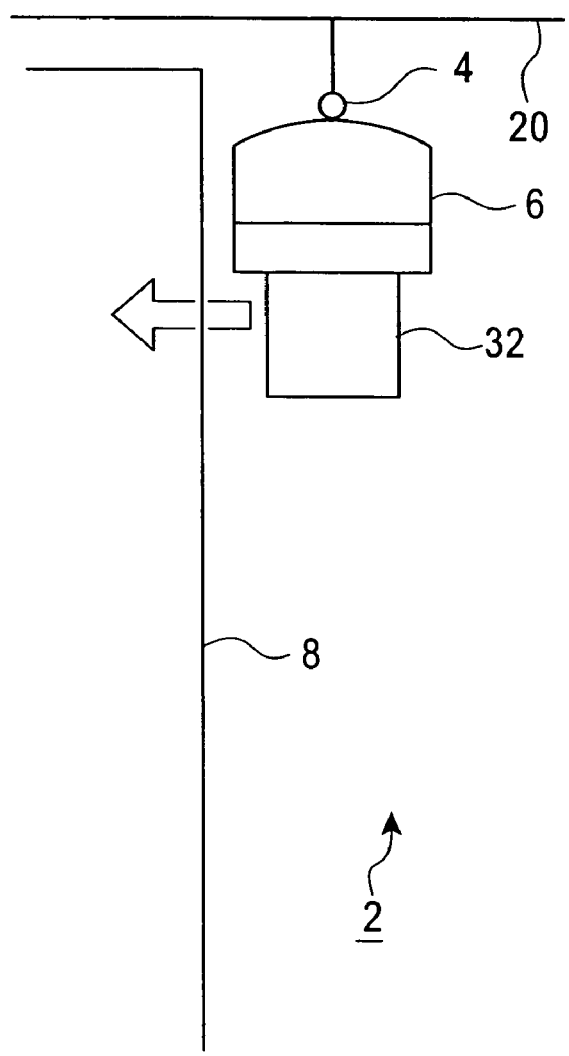
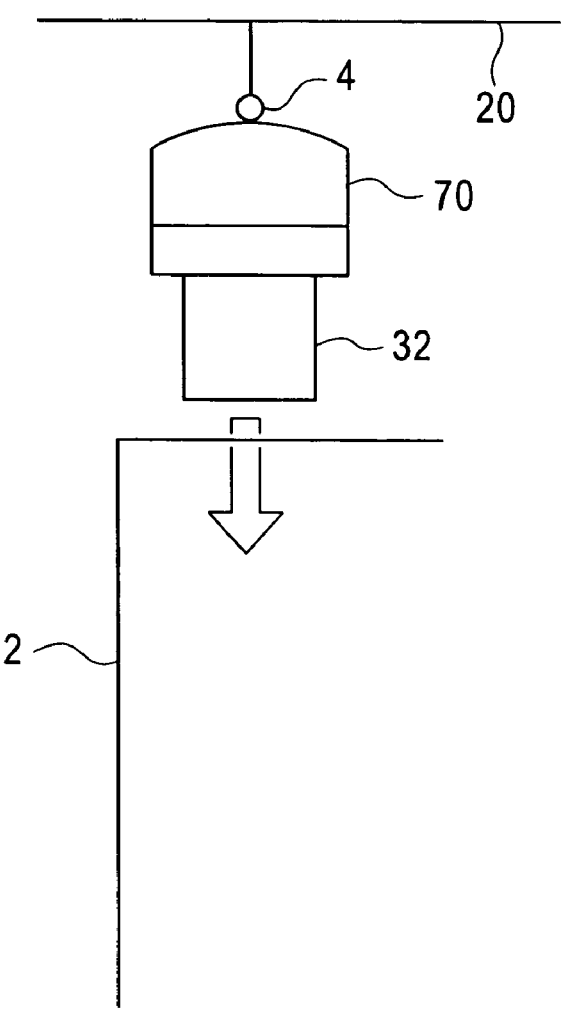

OVERHEAD TRAVELLING CARRIAGE SYSTEM

FIELD OF THE INVENTION

The present invention relates to an overhead travelling carriage system having a combination of an overhead travelling carriage and an automatic warehouse.

BACKGROUND OF THE INVENTION

An overhead travelling carriage is used to convey articles in clean rooms and common plants, warehouses, libraries, hospitals, and the like. The inventor examined methods of combining an automatic warehouse with the overhead travelling carriage so that the overhead travelling carriage can deliver an article directly to a shelf of the automatic warehouse. In this case, when a rack of the automatic warehouse is provided below a running rail for the overhead travelling carriage, the upper end of the rack must be located below the ceiling by a distance equal to a running space for the overhead travelling carriage. The inventor has noted that this is disadvantageous in terms of spaces. The inventor has also noted that passage of the overhead travelling carriage above the automatic warehouse is disadvantageous in terms of the installation and maintenance of the automatic warehouse and overhead travelling carriage system.

SUMMARY OF THE INVENTION

It is a basic object of the present invention to prevent a running rail for an overhead travelling carriage from occupying the space above a rack, while enabling an article to be transferred directly between the overhead travelling carriage and a shelf of the rack. It is an additional object of the present invention set forth in claim 2 to allow, for example, an easy change in the order of conveyance of articles. It is an additional object of the present invention set forth in claim 3 to allow top priority to be given to conveyance of urgent articles.

The present invention provides an overhead travelling carriage system in which a platform is elevated from and lowered to a load port located below a running rail to transfer an article between the platform and the load port, the overhead travelling carriage system being characterized in that the overhead travelling carriage is provided with lateral feeding means for moving the platform to a side of the running rail and an automatic warehouse is provided on a side of the running rail and has shelves each of which is open on its side facing the running rail so that the article can be transferred between each of the shelves having the open side and the overhead travelling carriage by laterally feeding and elevating and lowering the platform.

Preferably, a plurality of the shelves having the open side are provided at the same height level, and the overhead travelling carriage can be stopped freely and selectively in close proximity to a corresponding one of the plurality of shelves.

Preferably, at least one of the plurality of the shelves having the open side is assigned to conveyance of urgent articles and used as a shelf for urgent articles.

According to the present invention, the overhead travelling carriage is provided with the lateral feeding means for moving the platform to a side of the running rail, and the automatic warehouse is provided on a side of the running rail and has the shelf which is open on its side facing the running rail. The article can be transferred between the shelf of the automatic shelf and the overhead travelling carriage by laterally feeding and elevating and lowering the platform from immediately below the running rail. This eliminates the need for providing the automatic warehouse with a station comprising a conveyor and the like to deliver and receive articles to and from the overhead travelling carriage. Moreover, a running space for the overhead travelling carriage need not be provided above the automatic warehouse. Consequently, a high automatic warehouse can be installed. Further, no automatic warehouse is present below the running rail, and this allows the easy installation and maintenance of the overhead travelling carriage and running rail.

The plurality of shelves having the open side are provided at the same height level, and for example, the overhead travelling carriage can be stopped freely and selectively at each of the plurality of shelves. This allows the overhead travelling carriage to freely deliver and receive articles to and from the plurality of shelves. Consequently, the order of conveyance of articles can be arbitrarily changed. It is also possible to prevent the overhead travelling carriage from disadvantageously standing by near the automatic warehouse owing to a delay in the conveyance of articles in the automatic warehouse.

According to the aspect of the present invention set forth in claim 3, at least one of the plurality of the shelves having the open side is assigned to conveyance of urgent articles. Consequently, top priority can be given to the conveyance of the urgent articles.

BRIEF DESCRIPTION OF THE DRAWINGS

FIG. 4(a) shows an overhead travelling carriage system according to the embodiment. FIG. 4(b) shows an overhead travelling carriage system according to the conventional example.

DETAILED DESCRIPTION OF THE PREFERRED EMBODIMENTS

Figure 1:
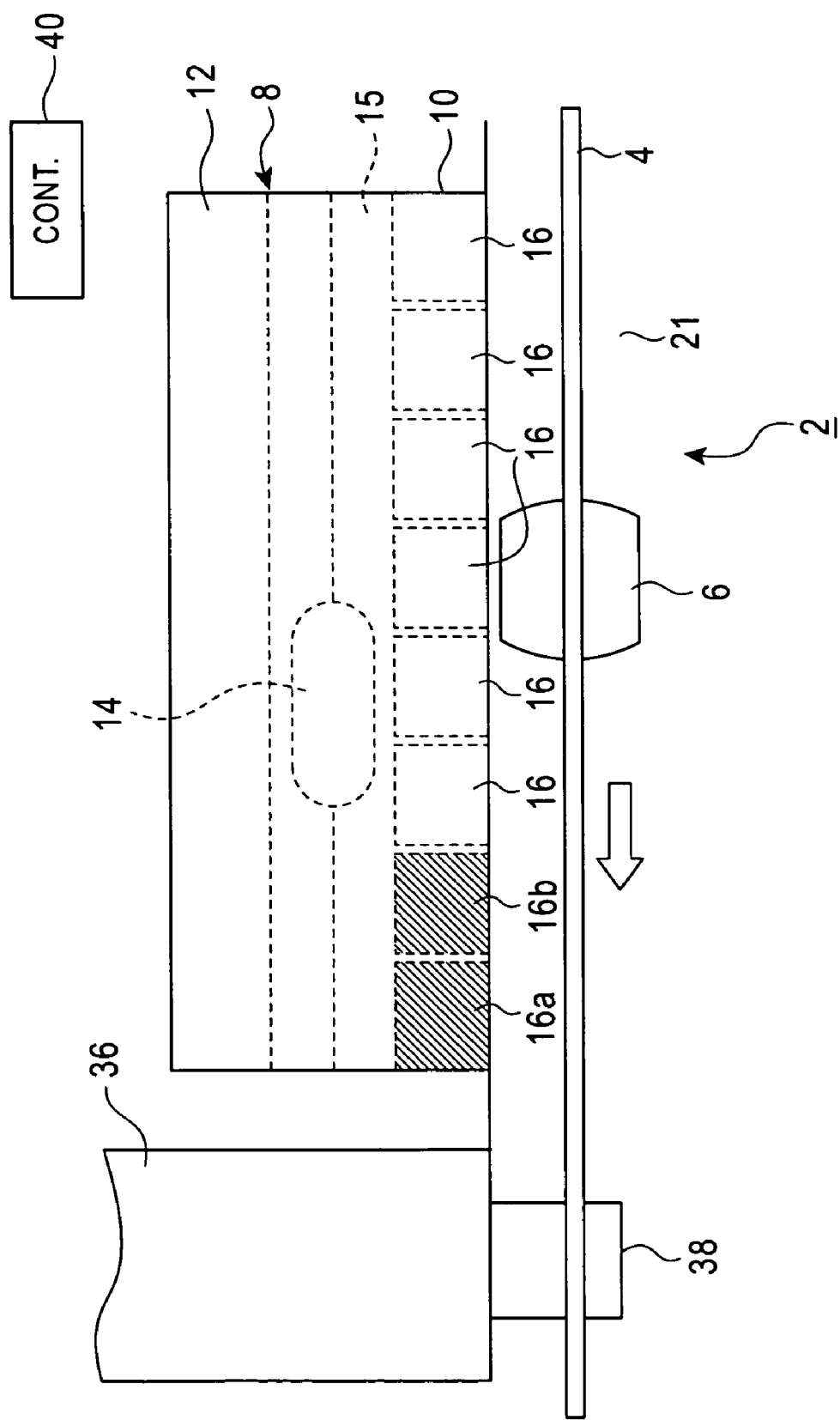
FIG. 1 is a top, plan view of an essential part of an overhead travelling carriage system according to an embodiment.

The optimum embodiment of the present invention will be shown below.

FIGS. 1 to 4 show the embodiment. In these figures, 2 is an overhead travelling carriage system. 4 is a running rail of the overhead travelling carriage system which is hung from a ceiling 20 of a clean room or the like using pillars 22. 6 is an overhead travelling carriage running along the running rail 4. 8 is an automatic warehouse provided on one side of the running rail 4 and, for example, parallel to the running rail 4. 10, 12 are, for example, a lateral pair of racks. It is only necessary to provide the rack 10 closer to the running rail 4, and the opposite rack 12 may be omitted. 14 is a stacker crane that is an example of conveying means in the automatic warehouse 8. 15 is a running space for the stacker crane 14.

The rack 10 is provided with open shelves 16 each of which is open on its side facing the running rail 4. In particular, some 16a, 16b of the open shelves 16 are dedicated for urgent articles. Only one urgent article shelf may be provided. The open shelf 16 is open on its side facing the running rail 4 and is closed on the other sides. Further, each of the open shelves 16 is higher than each of the other shelves 18 so that a lateral drive, elevation driving section, and a platform of the overhead travelling carriage 6 can enter the open shelf 16 together with an article. The shelves mean storage areas for individual articles in the racks 10, 11, and the rack means a structure composed of an aggregate of shelves. Moreover, if in addition to the overhead travelling carriage 6, an automated guided travelling carriage or a hand truck is used to convey articles, some of the shelves 18 are used as stations 19 and a conveyor or the like is laid so as to deliver and receive articles to and from the stations 19. Furthermore, the space below the running rail 4 is used as a passage 21.

The open shelves 16 can be provided at an arbitrary height level. The open shelves 16 are preferably located in any of the first to fourth stages from the top of the rack 10 and particularly preferably in the second or third stage from the top. When the open shelves 16 are provided slightly below the height of the bottom surface of a cassette 32 on the overhead travelling carriage 6 running along the running rail 4, this normally corresponds to the second or third stage from the top of the rack 10. In this case, one or two rows of shelves 18 can be provided above the openings 16. On the other hand, when the open shelves 16 are provided in the fifth or lower stage in the rack, the platform must be lowered with a large stroke in order to deliver and receive articles to and from the open shelves 16. In the embodiment, in addition to the platform, the lateral drive and elevation driving section, located below the lateral feeding section, advance into the open shelf 16. Accordingly, in the open shelf 16, a free space corresponding to the elevation stroke must be provided above the article. This degrades space efficiency.

The structure of the overhead travelling carriage 6 will be described below. A running driving section 24 runs the overhead travelling carriage 6 along the running rail 4. The overhead travelling carriage 6 receives power from an electricity supplying rail (not shown in the drawings) to communicate with a controller 40 described later. In the overhead travelling carriage 6, the lateral feeding section 26 laterally moves the elevation driving section 28 and platform 30 in a horizontal plane perpendicularly to the running rail 4. The stroke of the lateral movement is such that an article can be conveyed to the interior of the open shelf 16. 32 is a cassette as an example of an article to be conveyed. In this case, the cassette 32 accommodates a plurality of semiconductor substrates. The cassette 32 is conveyed with the platform 30 chucking a flange provided at the top of the cassette 32. 34 is a fall prevention cover that projects pawls (not shown in the drawings) to prevent the cassette 32 from falling during running.

Figure 2:
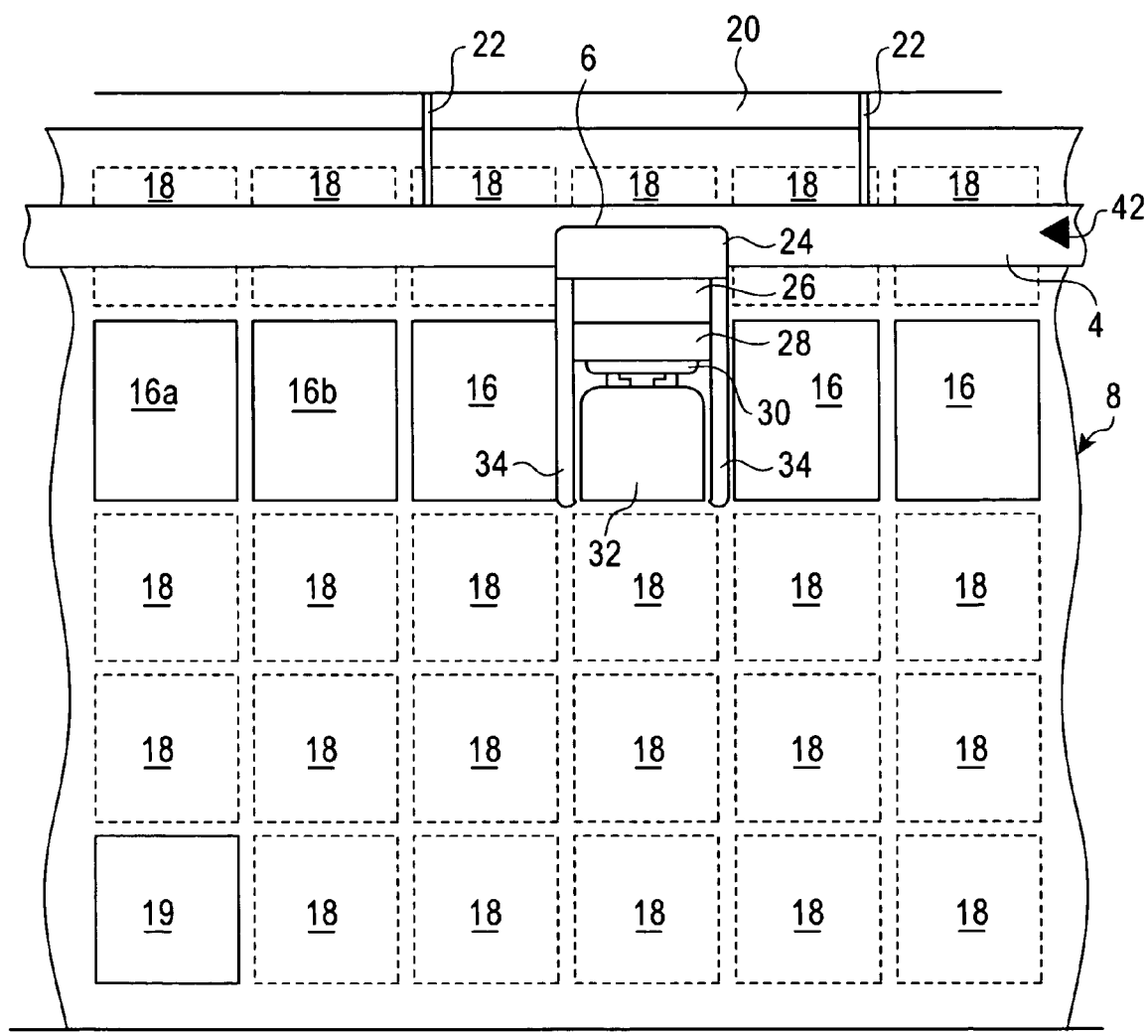
FIG. 2 is a side, plan view of an essential part of the overhead travelling carriage system according to the embodiment.

36 is a processing device for semiconductors. 38 is a load port of the processing device 36. The load port 38 is located below the running rail 4. The cassette 32 is delivered to and received from the load port 38 by elevating and lowering the platform 30. 40 is the controller that controls the overhead travelling carriage 6 and the automatic warehouse 8. 42 in FIG. 2 is a dog for stop control. For example, one or more dogs 42 are provided for one automatic warehouse 8. If the number of dogs 42 is small compared to the number of open shelves 16, the distance to a stop position after detection of the dog 42 is stored for each open shelf 16 so that the overhead travelling carriage 6 can be stopped in close proximity to the target open shelf 16.

Figure 3:
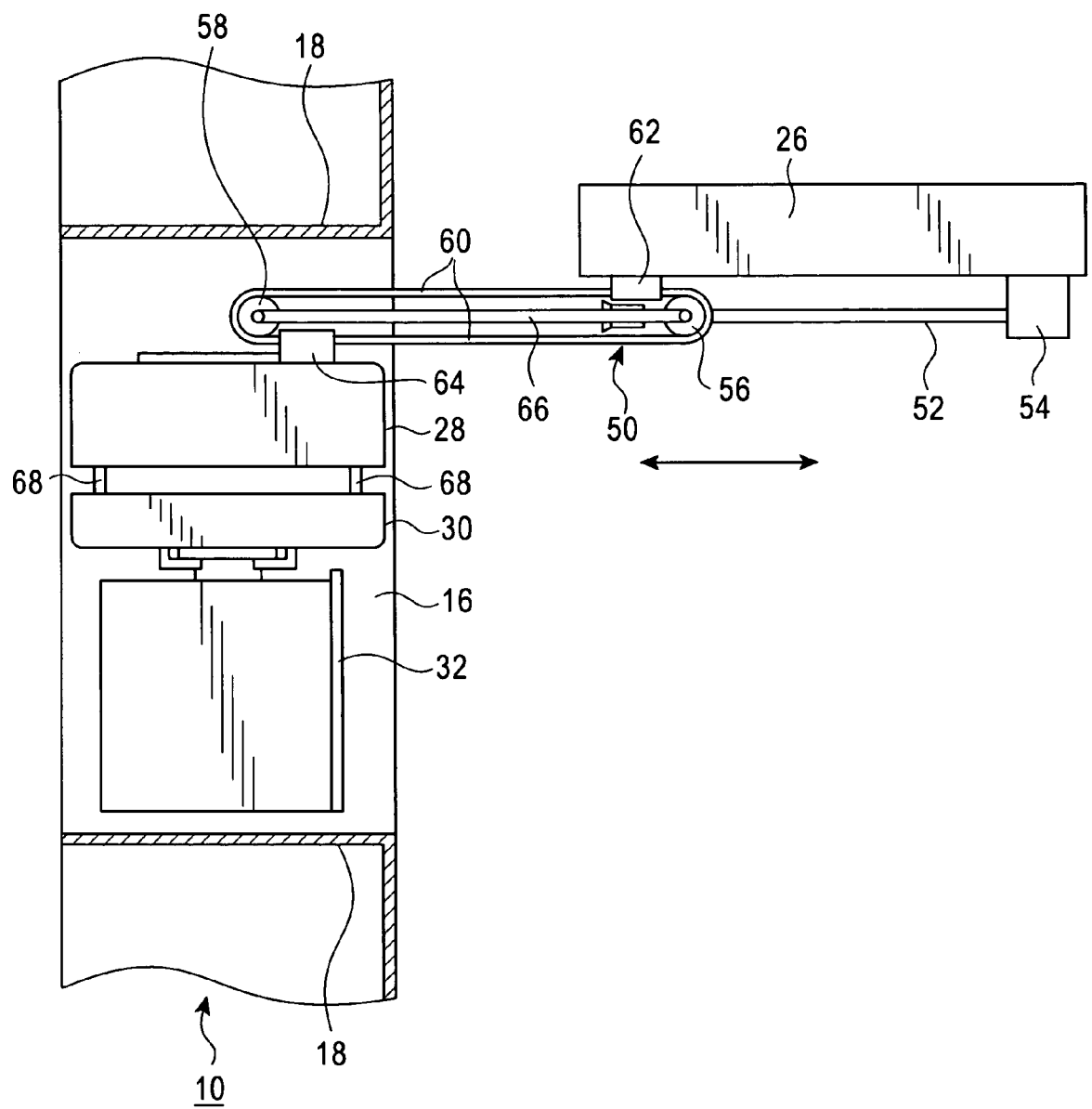
FIG. 3 is a partial sectional view showing the delivery between an overhead travelling carriage and a shelf in a rack according to the embodiment.

FIG. 3 shows lateral feeding of the platform 30. 50 is a lateral drive provided at the bottom of the lateral feeding section 26. The lateral drive 50 can be moved in a lateral direction (which is perpendicular to the running rail 4 in a horizontal plane) using a ball screw 52 and is guided by a linear guide (not shown in the drawings). 54 is a ball screw driving section. 56, 58 are a pair of sprockets. 60 is a belt joining the sprockets together. The belt 60 is fixed to the lateral feeding section 26 using a fixing section 62 and to the elevation driving section 28 using a fixing section 64. 68 is a hanging member such as a belt or a wire.

Driving the ball screw 52 moves the lateral drive 50, its frame 66, the sprockets 56, 58, and the like in the lateral direction. The top of the belt 60 is fixed to the lateral feeding section 26 using the fixing section 63. Accordingly, the belt 60 moves clockwise in FIG. 3. As a result, the fixing section 64 moves leftward in FIG. 3. Thus, the fixing section 64 moves with a stroke about double that made by the ball screw 52. The lateral drive 50 is thus a kind of double speed mechanism. The structure of the lateral feeding section 26 is arbitrary.

The overhead travelling carriage 6 is stopped in close proximity to one of the open shelves 16. Then, driving the lateral drive 50 advance the elevation driving section 28 and cassette 32 into the open shelf 16. Then, the hanging member 68 is slightly fed to place the cassette 32 on the open shelf 16 and the chuck is then released. Thus, the cassette 32 can be unloaded. For chucking, conversely, the empty platform 30 is laterally moved into the open shelf 30. Then, the cassette 32 is chucked and the platform 30 is returned.

Figure 4:
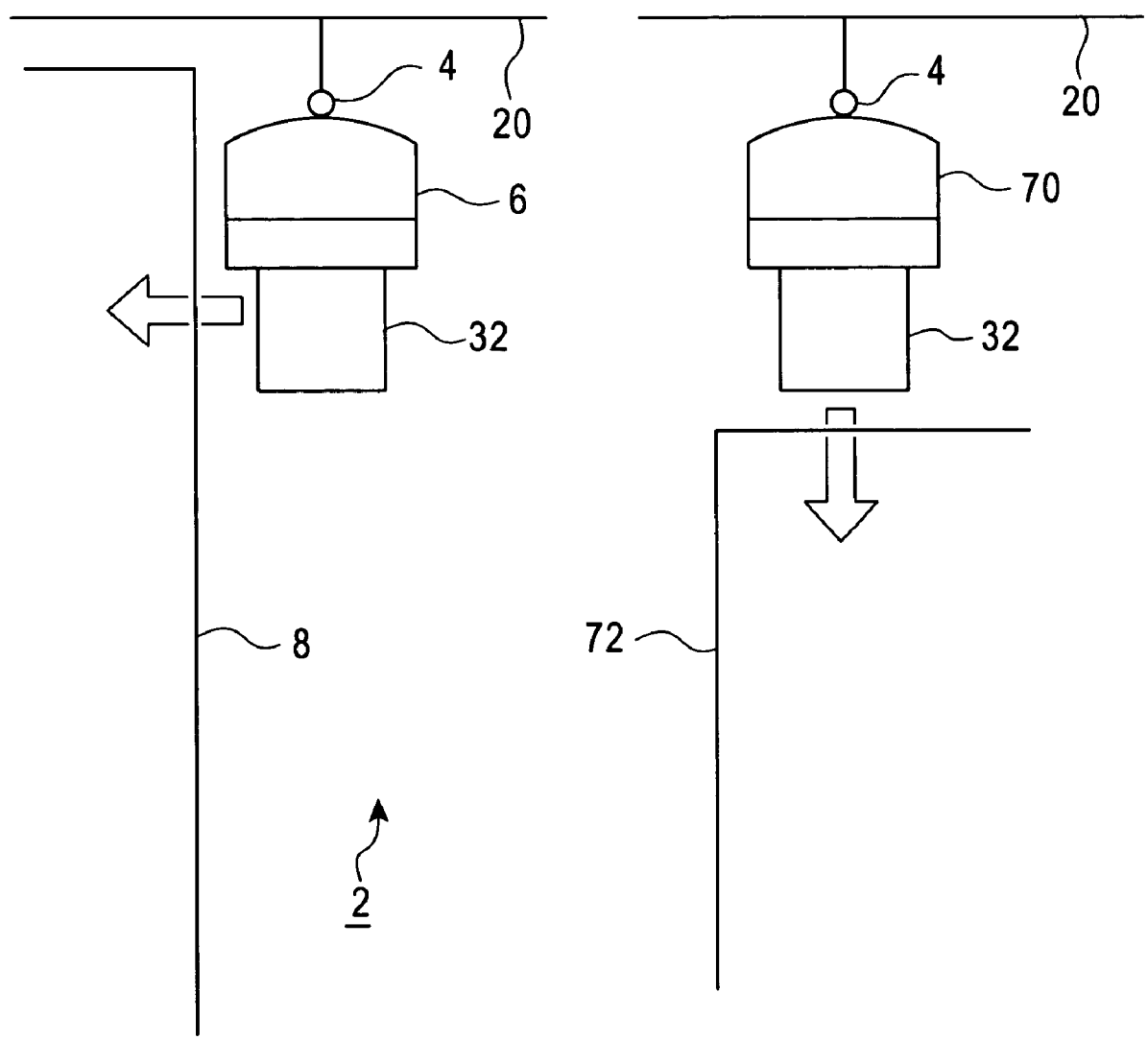
FIG. 4 is a diagram showing a comparison of the embodiment with an overhead travelling carriage system according to a conventional example.

FIG. 4 shows a comparison of the overhead travelling carriage system 2 according to the embodiment with a comparative example in which an overhead travelling carriage 70 runs above an automatic warehouse 72 to transfer an article from above the rack. The automatic warehouse 72 in the comparative example requires a free space above it which corresponds to a running space for the overhead travelling carriage 70. This degrades space efficiency. In contrast, in the embodiment, the automatic warehouse 8 can be installed which extends up to the vicinity of the ceiling. The space below the running rail 4 is not occupied by the automatic warehouse 8. This facilitates maintenance or the like.

The embodiment produces the following effects.

(1) The lateral movement and elevation and lowering of the platform can be utilized to transfer articles directly between one of the open shelves in the automatic warehouse and the overhead travelling carriage. This eliminates the need to provide the automatic warehouse with stations used to deliver and receive articles to and from the overhead travelling carriage.

(2) Since articles can be transferred between the plurality of open shelves and the overhead travelling carriage, a large number of shelves can be used to transfer articles to and from the overhead travelling carriage. Thus, for example, the following operation is possible: an article with high priority is conveyed using the overhead travelling carriage and unloaded onto an empty open shelf, while an article with high priority from another open shelf in the same automatic warehouse is loaded onto the overhead travelling carriage for conveyance. In this manner, the order of conveyance can be changed during the conveyance.

(3) Since articles can be transferred between the large number of open shelves and the overhead travelling carriage, a stacker crane or the like in the automatic warehouse has only to have a relatively low conveying capability. When the rack lying opposite the running rail is used to store articles with low priority, an appropriate one of the automatic warehouses can be used depending on the priority of conveyance.

(4) Since the large number of shelves can be used to transfer articles to and from the overhead travelling carriage, some of them can be assigned to urgent articles. This particularly facilitates the conveyance of the urgent articles.

(5) Since the open shelves are arranged at the same height level, a fixed elevation stroke can be used to transfer articles to and from the open shelves.

In the embodiment, the lateral feeding section laterally feeds the elevation driving section. However, the elevation driving section may elevate and lower the lateral feeding section and the platform located below the lateral feeding section.

The invention claimed is:

1. An overhead travelling carriage system, comprising:
   an overhead traveling carriage running on a running rail, said overhead traveling carriage including
   an elevation driving section,
   a platform elevated from and lowered to a load port located below the running rail to transfer an article between the platform and the load port, said platform being elevated and lowered by said elevation driving section, and
   a lateral feeding means for moving the platform and the elevation driving section to a side of the running rail, and
   an automatic warehouse provided on a side of said running rail including
   open shelves, each of which is permanently open on a side of said open shelves nearest to the running rail,
   closed shelves, separate from said open shelves, each of which is permanently closed on a side of said closed shelves nearest to the running rail, and
   a stacker crane which conveys the article within the automatic warehouse,
   wherein the article can be transferred between each of the open shelves and the overhead travelling carriage by laterally feeding and elevating and lowering the platform,
   wherein the article, the elevation driving section, and the platform are insertable into said open shelves,
   wherein all of said open shelves are disposed below at least one row of said closed shelves and above a plurality of rows of said closed shelves, and
   wherein said open shelves and said closed shelves overlap each other in a top, plan view.

2. The overhead travelling carriage system according to claim 1, wherein a plurality of the open shelves are provided at the same height level, and the overhead travelling carriage can be stopped freely and selectively in close proximity to a corresponding one of the plurality of open shelves.

3. The overhead travelling carriage system according to claim 2,
   wherein a priority is assigned to each article such that one or more articles are high priority articles, and one or more articles are low priority articles, and
   wherein at least one of the plurality of the open shelves is assigned to conveyance of high priority articles and used as a shelf for high priority articles.

4. A method of conveying and storing articles, comprising:
   using an elevation driving section for elevating and lowering a platform of an overhead traveling carriage holding an article to and from a load port located below a running rail to transfer said article between said platform and the load port,
   transferring said article to an automatic warehouse by laterally feeding, elevating and lowering the platform, said automatic warehouse comprising open shelves, each of which is permanently open on a side of said open shelves nearest to the overhead traveling carriage, and closed shelves, separate from said open shelves, each of which is permanently closed on a side of said closed shelves nearest to the overhead traveling carriage,
   assigning a priority to each of said articles, with at least one article having a high priority and at least one article having a low priority, and
   storing high priority articles on urgent article storage shelves,
   wherein said transferring includes inserting said article, said elevation driving section, and said platform into said open shelves,
   wherein one or more of said open shelves are said urgent article storage shelves dedicated for storage of high priority articles,
   wherein all of said urgent article storage shelves are disposed below at least one row of said closed shelves and above a plurality of rows of said closed shelves, and
   wherein said open shelves and said closed shelves overlap each other in a top, plan view.

* * * * *